US007913232B2

(12) United States Patent
Erkkinen

(10) Patent No.: US 7,913,232 B2
(45) Date of Patent: Mar. 22, 2011

(54) CERTIFYING SOFTWARE FOR SAFETY-CRITICAL SYSTEMS

(75) Inventor: Thomas J. Erkkinen, Ann Arbor, MI (US)

(73) Assignee: The Math Works, Inc., Natick, MA (US)

( * ) Notice: Subject to any disclaimer, the term of this patent is extended or adjusted under 35 U.S.C. 154(b) by 1594 days.

(21) Appl. No.: 10/371,975

(22) Filed: Feb. 21, 2003

(65) Prior Publication Data

US 2004/0169591 A1 Sep. 2, 2004

(51) Int. Cl.
*G06F 9/44* (2006.01)
*G06F 11/00* (2006.01)
(52) U.S. Cl. .......................... 717/126; 717/125; 726/25
(58) Field of Classification Search .................. None
See application file for complete search history.

(56) References Cited

U.S. PATENT DOCUMENTS

| | | | |
|---|---|---|---|
| 7,139,999 B2 * | 11/2006 | Bowman-Amuah | 717/101 |
| 7,228,461 B2 * | 6/2007 | Krietemeyer et al. | 714/45 |
| 7,284,274 B1 * | 10/2007 | Walls et al. | 726/25 |
| 7,337,429 B1 * | 2/2008 | Psaras et al. | 717/101 |
| 7,380,270 B2 * | 5/2008 | Tracy et al. | 726/3 |
| 2004/0210873 A1 * | 10/2004 | Tudor | 717/124 |

OTHER PUBLICATIONS

Vilkomir et al., An "asymmetric" approach to the assessment of safety-critical software during certification and licensing, Apr. 2000, ESCOM-SCOPE 2000 Conference, Munich, Germany.*
Ayyub at al., Web-based System Reliability Assessment (WSTAR): Fault Tree Analysis (FTA), Nov. 1998, US Army Corps of Engineers.*
C. Downing, A Primer on Software Safety Certification, 2002, Validated Software Corporation.*
J. Wlad, DO-178B and Safety-Critical Software, 2000, Wind River Systems, Inc.*
D. Fowler, A Suitable Basis for the Certification of Safety-Critical Transport-Infrastructure System, 2000, Springer-Verlag, Berlin, Heidelberg.*
D. Lu, Fault Contribution Trees for Product Families, 2002, IEEE.*
Camus et al., "Combining SDL with Synchronous Data Flow Modelling for Distributed Control Systems", 2001, Springer-Verlag Berlin Heidelberg, pp. 1-18.*
Francois-Xavier Dormoy, "SCADE—The Cost and Time Effective Solution for Safety Critical Software Developemnt", 2001, Esterel Technologies, pp. 1-23.*
Joseph Wlad, "DO-178B and Safety-Critical Software", Jul. 23, 2001, Wind River Systems, Inc., pp. 1-33.*
Tom Erkkinen, "Production Code Generation for Safety-Critical Systems", 2004 SAE International, pp. 1-7.*
Rational®, "Rational Unified Process, Best Practices for Software Development Teams," Rational®, the software development company, Rational Software White Paper, TP026B, retrieved online at http://www.ibm.com/developerworks/rational/library/content/03July/1000/1251/1251_bestpractices_TP026B.pdf (2001).

* cited by examiner

*Primary Examiner* — Michael J Yigdall
*Assistant Examiner* — Ben C Wang
(74) *Attorney, Agent, or Firm* — Nelson Mullins Riley & Scarborough LLP; Kevin J. Canning

(57) ABSTRACT

A method of collecting information includes retrieving a criterion for certifying software for use on a safety-critical system, receiving user input information associated to the criterion, determining if the input information satisfies criterion for certifying the software for use on the safety-critical system, and providing output information to the user where the output information is identifying if the criterion is satisfied.

40 Claims, 4 Drawing Sheets

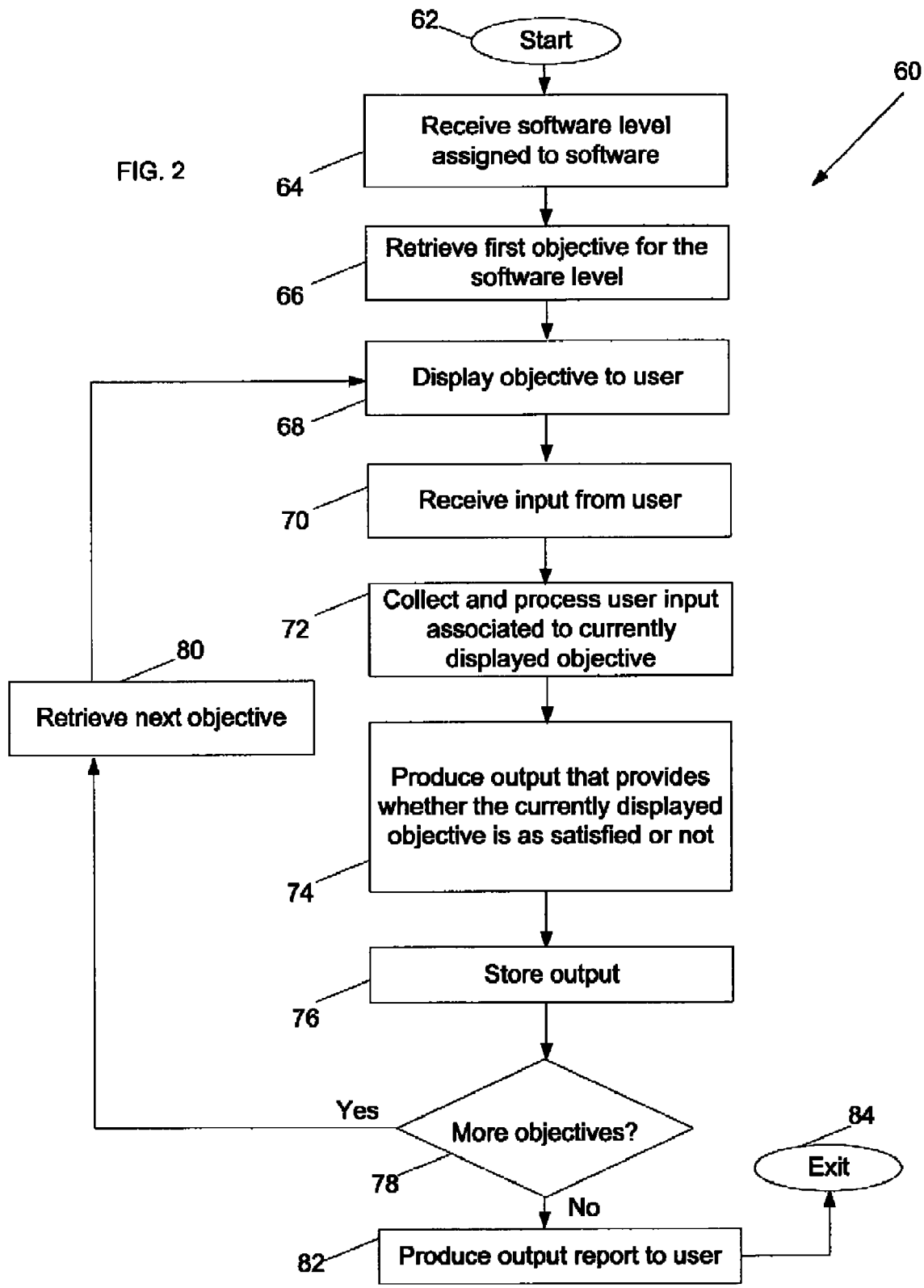

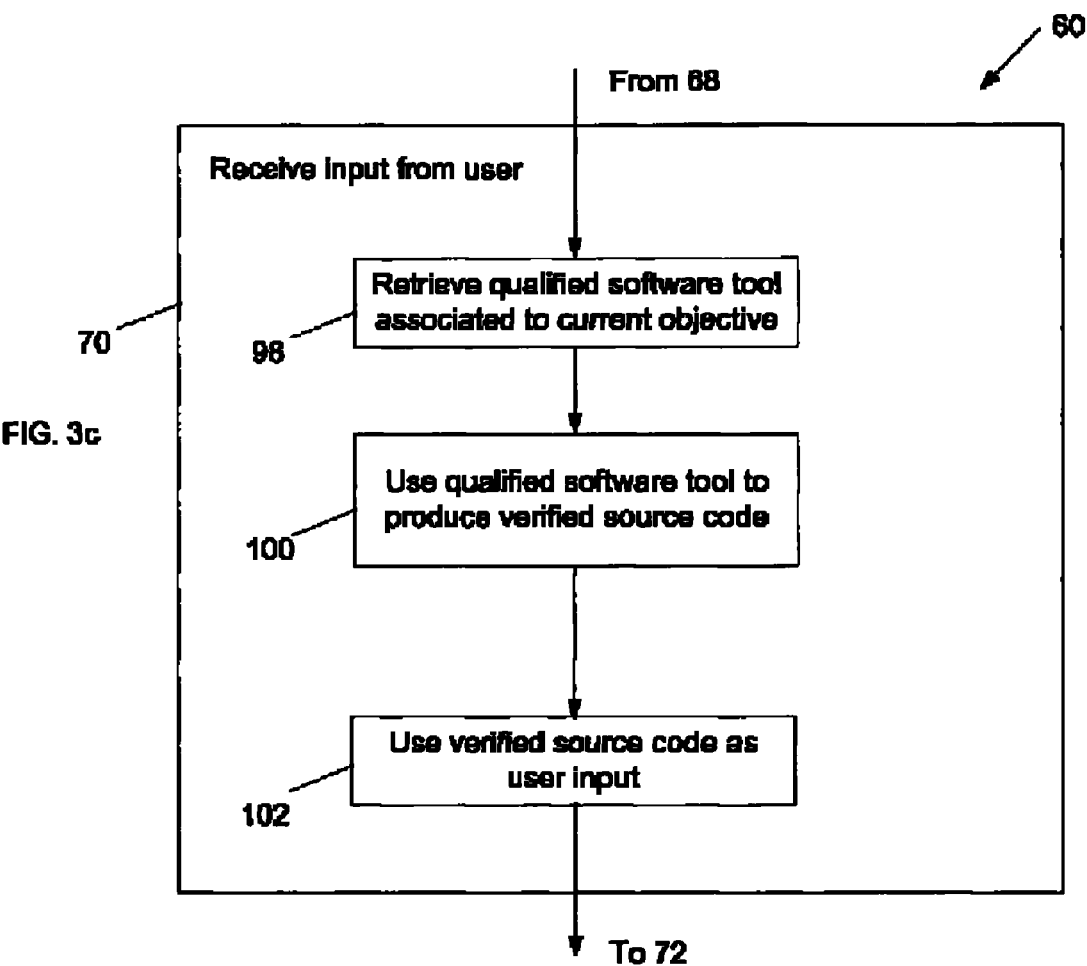

CERTIFYING SOFTWARE FOR SAFETY-CRITICAL SYSTEMS

FIELD OF THE INVENTION

The present invention relates to certifying software for safety-critical systems.

BACKGROUND

A safety-critical system is a computer, electronic, or electromechanical system that upon failure can cause injury or loss of human life, severe environmental damage, provide a large adverse financial impact, or other similar catastrophic event. A failure of a safety-critical system includes failure of the system to perform intended functions, failure to warn the operator(s) or customer(s) of an unsafe condition, or failure to display appropriate information. For example, an aircraft control system is considered a safety critical system since the failure of the system can result in the loss of passengers and aircraft crew.

To incorporate software into safety critical systems, standards, such as the Radio Technical Committee on Aeronautics (RTCA) guidance document DO-178B, entitled "Software Considerations in Airborne Systems and Equipment Certification", were developed to focus on software dependence of safety-critical systems. By applying these standards during software development, safety hazards can be identified along with detecting conditions that can lead to the hazards.

SUMMARY

In an aspect, the invention features a method of collecting information including retrieving a first criterion for certifying software for use on a safety-critical system, receiving user input information associated to the first criterion, determining if the input information aids in satisfying the first criterion for certifying the software for use on the safety-critical system, and providing output information to the user, the output information identifying if the first criterion is satisfied.

Embodiments may include one or more of the following. The received user input information may be requested. The user input information may include user-entered text. The user input information may include a user-entered file identifier. The file identifier may identify a file containing a block diagram model. The file identifier may identify a file containing information satisfying the first criterion. The method of collecting information may include storing the received user input information. The method of collecting information may include storing the output information. The method of collecting information may include processing the user input information into processed information satisfying the first criterion. The method of collecting information may include storing the processed information. The first criterion may include an objective of a guidance document. The guidance document may be the Radio Technical Committee on Aeronautics guidance document DO-178B. Providing the output information may include displaying the output information to the user. Providing the output information may include producing an output document. The safety-critical system may include an aircraft. The method of collecting information may include assigning a software level to the software. The assigned software level may be based on the software failing on the safety-critical system. Receiving user input may include using a qualified software tool. The method of collecting information may include using a qualified software tool. The method of collecting information may include repeating retrieving, receiving, determining, and providing for a second criterion, different from the first criterion.

In another aspect, the invention features a method including in a computer system, retrieving a first criterion for certifying the software for use on a safety-critical system, receiving user input information associated to the first criterion, determining if the input information aids in satisfying the first criterion for certifying the software for use on the safety-critical system, and providing output information to the user, the output information identifying if the first criterion is satisfied.

In another aspect, the invention features an article including a storage medium having stored thereon instructions that when executed by a machine result in the following: retrieve a first criterion for certifying software for use on a safety-critical system, receive user input information associated to the first criterion, determine if the input information aids in satisfying the first criterion for certifying the software for use on the safety-critical system, and provide output information to the user, the output information identifying if the first criterion is satisfied.

Embodiments may include one or more of the following. The received user input information may be requested. The user input information may include user-entered text. The user input information may include a user-entered file identifier. The file identifier may identify a file containing a block diagram model. The file identifier may identify a file containing information satisfying the first criterion. The article may include instructions that when executed cause the machine to store the received user input information. The article may include instructions that when executed cause the machine to store the output information. The article may include instructions that when executed cause the machine to process the user input information into processed information satisfying the first criterion. The article may include instructions that when executed cause the machine to store the processed information. The first criterion may include an objective of a guidance document. The guidance document may be the Radio Technical Committee on Aeronautics guidance document DO-178B. The article may include instructions that when executed cause the machine to provide the output information that may include displaying the output information to the user. The article may include instructions that when executed cause the machine to provide the output information that may include producing an output document. The safety-critical system may include an aircraft. The article may include instructions that when executed cause the machine to assign a software level to the software. The assigned software level may be based on the software failing on the safety-critical system. The article may include instructions that when executed cause the machine to receive user input using a qualified software tool. The article may include qualified software tool instructions. The article may include instructions that when executed cause the machine to repeat retrieving, receiving, determining, and providing for a second criterion, different from the first criterion.

In another aspect, the invention features a graphical user interface (GUI) including a workspace, a set of graphical semantics for displaying a first criterion for certifying software for use on a safety-critical system, a set of graphical semantics for receiving user input information to aid in satisfying the first criterion, and a set of graphical semantics for displaying output information to the user, the output information identifying if the first criterion is satisfied.

Embodiments may include one or more of the following. The received user input information may be requested. The graphical user interface may include a qualified software tool.

The graphical user interface may include a set of graphical semantics for displaying a second criterion for certifying the software for use on the safety-critical system.

The invention may include one or more of the following advantages. By guiding a developer through each pertinent objective associated in developing a particular piece of software, the developer can determine if the appropriate certification information needed for certification has been collected. By guiding the developer through the pertinent objectives, the developer can also efficiently determine what certification information, if any, still needs to be collected to satisfy the objectives. Additionally, by processing information supplied by the developer into a form and structure needed for certification, the developer is removed from participating in additional processing.

Other features, objects, and advantages of the invention will be apparent from the description and drawings, and from the claims.

DESCRIPTION OF DRAWINGS

FIG. 2 is a flow diagram of a software certification process.

FIG. 3a-c are flow diagrams of a portion of the software certification process of FIG. 2.

DESCRIPTION OF TABLES

Figure 1:
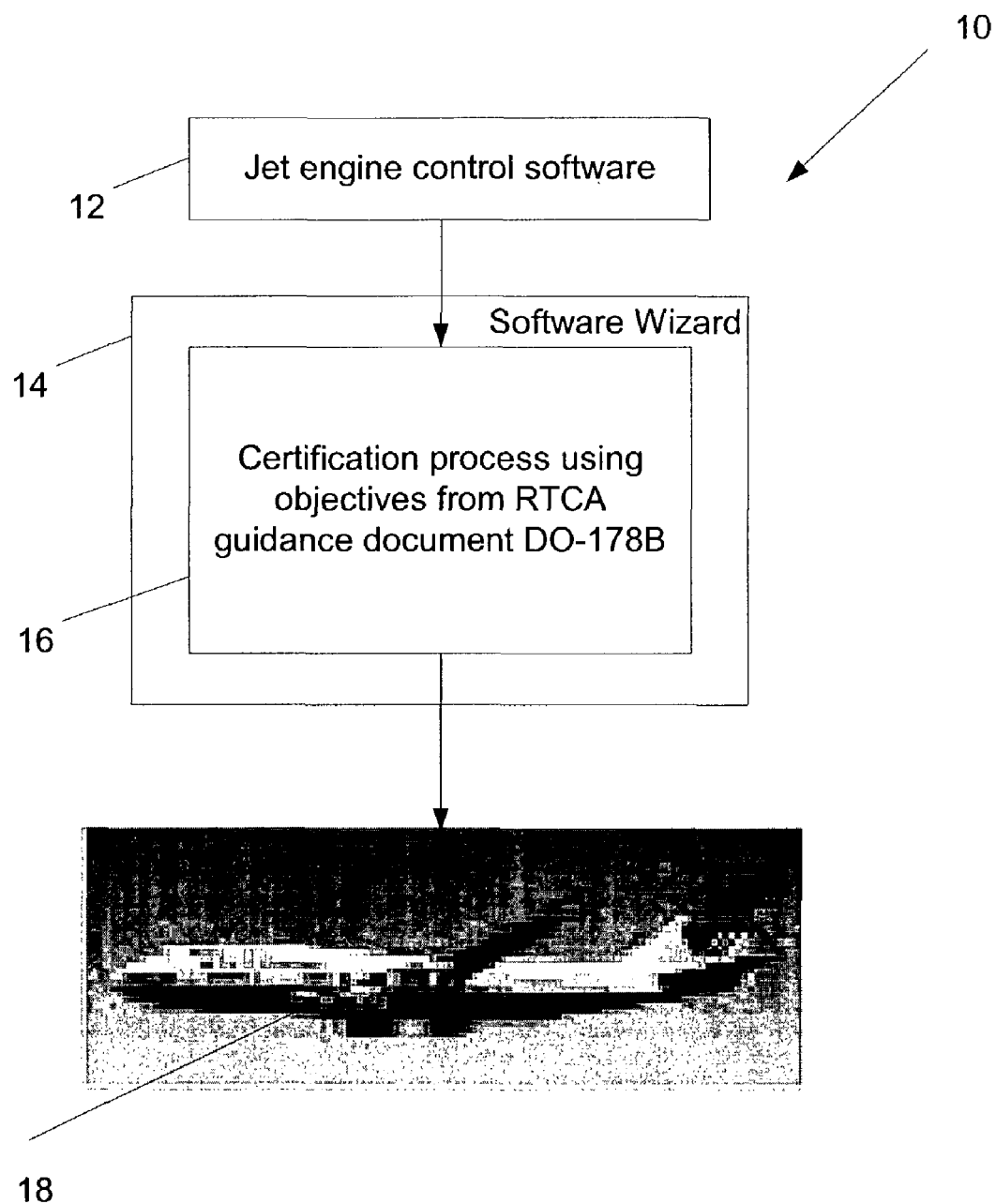
FIG. 1 is a block diagram of software, a software wizard, and a safety-critical system.

TABLE 1 is a table of failure condition categories, descriptions, and software levels from RTCA document DO-178B.

TABLE 2 is a table of an objective, objective applicability, objective output, and objective control categories.

TABLE 3-12 are certification tables from RTCA document DO-178B.

TABLE 1

| Failure Condions Category (22) | Description (24) | Software Level (20) |
|---|---|---|
| Catastrophic | Failure conditions which would prevent continued safe flight and landing of the aircraft. | A |
| Hazardous | Failure condition which would reduce the capability of the aircraft or the ability of the crew to cope with adverse operation conditions to the extent that there would be:<br>(1) a large reduction in safety margins or functional capabilities,<br>(2) physical distess or higher workload such that the flight crew could not be relied on to perform their tasks accurately or completely, or<br>(3) adverse effects on occupants including serious or potential fatal injuries to a small number of occupants | B |
| Major | Failure conditions which would reduce the capability of the aircraft or the ability of the crew to cope with adverse operation conditions to be extent that there would be, for example, a significant reduction in safety margins or functional capabilities, as significant increase in crew workload or in conditions impairing crew efficiency, or discomfort to occupants, possibly including injuries. | C |
| Minor | Failure conditions which would not significantly reduce aircraft safety, and which would involve crew actions that are well within their capabilities. | D |
| No Effect | Failure conditions which do not affect the operational capability of the aircraft or increase crew workload. | E |

TABLE 2

| | Objective (26) | | Applicability | Output | | Control Category |
|---|---|---|---|---|---|---|
| | Description | Ref. | A B C D | Description | Ref. | A B C D |
| 1 | Low-level requirements comply with high-level requirements. | 6.3.2a | • • ○ | Software Verification Results | 11.14 | 2 2 2 |

28  30  32  34 38  44  46  48 52
       36  40           50  54

TABLE 2-continued

LEGEND:
- • The objective should be satisfied with independence.
- ° The objective should be satisfied
- Blank Satidfaction of objective is all apllicants discretion
- ① Data satisfies the objective of Control Category 1 (CC1).
- ② Data satisfies the objective of Control Category2 (CC2).

42

TABLE 3

Software Planning Process

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | Software development and Integral processes activities are defined. | 4.1a 4.3 | ○ | ○ | ○ | ○ | Plan for Software Aspects of Certification | 11.1 | ① | ① | ① | ① |
| | | | | | | | Software Development Plan | 11.2 | ① | ① | ② | ② |
| | | | | | | | Software Verification Plan | 11.3 | ① | ① | ② | ② |
| | | | | | | | SCM Plan | 11.4 | ① | ① | ② | ② |
| | | | | | | | SQA Plan | 11.5 | ① | ① | ② | ② |
| 2 | Transition criteria, inter-relationships and sequencing among processes are defined. | 4.1b 4.3 | ○ | ○ | ○ | | | | | | | |
| 3 | Software life cycle environment is defined. | 4.1c | ○ | ○ | ○ | | | | | | | |
| 4 | Additional considerations are addressed. | 4.1d | ○ | ○ | ○ | ○ | | | | | | |
| 5 | Software development standards are defined. | 4.1e | ○ | ○ | ○ | | SW Requirements Standards | 11.6 | ① | ① | ② | |
| | | | | | | | SW Design Standards | 11.7 | ① | ① | ② | |
| | | | | | | | SW Code Standards | 11.8 | ① | ① | ② | |
| 6 | Software plans comply with this document. | 4.1f 4.6 | ○ | ○ | ○ | | SQA Records | 11.19 | ② | ② | ② | |
| | | | | | | | Software Verification Results | 11.14 | ② | ② | ② | |
| 7 | Software plans are coordinated. | 4.1g 4.6 | ○ | ○ | ○ | | SQA Records | 11.19 | ② | ② | ② | |
| | | | | | | | Software Verification Results | 11.14 | ② | ② | ② | |

LEGEND:
● The objective should be satisfied with Independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 4

Software Development Processes

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | High-level requirements are developed. | 5.1.1a | ○ | ○ | ○ | ○ | Software Requirements Data | 11.9 | ① | ① | ① | ① |
| 2 | Derived high-level requirements are defined. | 5.1.1b | ○ | ○ | ○ | ○ | Software Requirements Data | 11.9 | ① | ① | ① | ① |
| 3 | Software architecture is developed. | 5.2.1a | ○ | ○ | ○ | ○ | Design Description | 11.10 | ① | ① | ② | ② |
| 4 | Low-level requirements are developed. | 5.2.1a | ○ | ○ | ○ | ○ | Design Description | 11.10 | ① | ① | ② | ② |
| 5 | Derived low-level requirements are defined. | 5.2.1b | ○ | ○ | ○ | ○ | Design Description | 11.10 | ① | ① | ② | ② |

TABLE 4-continued

Software Development Processes

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 6 | Source Code is developed. | 5.3.1a | ○ | ○ | ○ | ○ | Source Code | 11.11 | ① | ① | ① | ① |
| 7 | Executable Object Code is produced and integrated in the target computer. | 5.4.1a | ○ | ○ | ○ | ○ | Executable Object Code | 11.12 | ① | ① | ① | ① |

LEGEND:
● The objective should be satisifed with Independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 5

Verification Of Outputs of Software Requirements Process

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | Software high-level requirements comply with system requirements. | 6.3.1a | ● | ● | ○ | ○ | Software Verification Results | 11.14 | ② | ② | ② | ② |
| 2 | High-level requirements are accurate and consistent. | 6.3.1b | ● | ● | ○ | ○ | Software Verification Results | 11.14 | ② | ② | ② | ② |
| 3 | High-level requirements are compatible with target computer. | 6.3.1c | ○ | ○ | | | Software Verification Results | 11.14 | ② | ② | | |
| 4 | High-level requirements are verifiable. | 6.3.1d | ○ | ○ | ○ | | Software Verification Results | 11.14 | ② | ② | ② | |
| 5 | High-level requirements conform to standards. | 6.3.1e | ○ | ○ | ○ | | Software Verification Results | 11.14 | ② | ② | ② | |
| 6 | High-level requirements are traceable to system requirements. | 6.3.1f | ○ | ○ | ○ | ○ | Software Verification Results | 11.14 | ② | ② | ② | ② |
| 7 | Algorithms are accurate. | 6.3.1g | ● | ● | ○ | | Software Verification Results | 11.14 | ② | ② | ② | |

LEGEND:
● The objective should be satisfied with independence.
○ The objective should be a satisfied.
Blank Satisfaction of objective is at applicant's discretion.
① Data satisfies the objectives of Control Category 1 (CC1).
② Data satisfies the objectives of Control Category 2 (CC2).

TABLE 6

Verification Of Outputs of Software Design Process

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | Low-level requirements comply with high-level requirements. | 6.3.2a | ● | ● | ○ | | Software Verification Results | 11.14 | ② | ② | ② | |
| 2 | Low-level requirements are accurate and consistent. | 6.3.2b | ● | ● | ○ | | Software Verification Results | 11.14 | ② | ② | ② | |
| 3 | Low-level requirements are compatible with target computer. | 6.3.2c | ○ | ○ | | | Software Verification Results | 11.14 | ② | ② | | |

TABLE 6-continued

Verification Of Outputs of Software Design Process

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 4 | Low-level requirements are verifiable. | 6.3.2d | ○ | ○ | | | Software Verification Results | 11.14 | ② | ② | | |
| 5 | Low-level requirements conform to standards. | 6.3.2e | ○ | ○ | ○ | | Software Verification Results | 11.14 | ② | ② | ② | |
| 6 | Low-level requirements are traceable to high-level requirements. | 6.3.2f | ○ | ○ | ○ | | Software Verification Results | 11.14 | ② | ② | ② | |
| 7 | Algorithms are accurate. | 6.3.2g | ● | ● | ○ | | Software Verification Results | 11.14 | ② | ② | ② | |
| 8 | Software architecture is compatible with high-level requirements. | 6.3.3a | ● | ○ | ○ | | Software Verification Results | 11.14 | ② | ② | ② | |
| 9 | Software architecture is consistent. | 6.3.2b | ● | ○ | ○ | | Software Verification Results | 11.14 | ② | ② | ② | |
| 10 | Software architecture is compatible with target computer. | 6.3.3c | ○ | ○ | | | Software Verification Results | 11.14 | ② | ② | | |
| 11 | Software architecture is verifiable. | 6.3.3d | ○ | ○ | | | Software Verification Results | 11.14 | ② | ② | | |
| 12 | Software architecture. conforms to standards | 6.3.3e | ○ | ○ | ○ | | Software Verification Results | 11.14 | ② | ② | ② | |
| 13 | Software partitioning integrity is confirmed. | 6.3.3f | ● | ○ | ○ | ○ | Software Verification Results | 11.14 | ② | ② | ② | ② |

LEGEND:
● The objective should be satisfied with independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 7

Verification Of Outputs of Software Coding & Integration Processes

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | Source Code complies with low-level requirements. | 6.3.4a | ● | ● | ○ | | Software Verification Results | 11.14 | ② | ② | ② | |
| 2 | Source Code complies with software architecture. | 6.3.4b | ● | ○ | ○ | | Software Verification Results | 11.14 | ② | ② | ② | |
| 3 | Source Code is Verifiable. | 6.3.4c | ○ | ○ | | | Software Verification Results | 11.14 | ② | ② | | |
| 4 | Source Code conforms to standards. | 6.3.4d | ○ | ○ | ○ | | Software Verification Results | 11.14 | ② | ② | ② | |
| 5 | Source Code is traceable to low-level requirements. | 6.3.4e | ○ | ○ | ○ | | Software Verification Results | 11.14 | ② | ② | ② | |
| 6 | Source Code is accurate and consistent. | 6.3.4f | ● | ○ | ○ | | Software Verification Results | 11.14 | ② | ② | ② | |
| 7 | Output of software integration process is complete and correct. | 6.3.5 | ○ | ○ | ○ | | Software Verification Results | 11.14 | ② | ② | ② | |

LEGEND:
● The objective should be satisfied with independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 8

Testing of Outputs of Integration Process

| Objective | | Applicability by SW Level | | | | Output | | Control Category by SW level | | | |
|---|---|---|---|---|---|---|---|---|---|---|---|
| Description | Ref. | A | B | C | D | Description | Ref. | A | B | C | D |
| 1 Executable Object Code complies with high-level requirements. | 6.4.2.1 6.4.3 | ○ | ○ | ○ | ○ | Software Verification Cases and Procedures | 11.13 | ① | ① | ② | ② |
| | | | | | | Software Verification Results | 11.14 | ② | ② | ② | ② |
| 2 Executable Object Code is robust with high-level requirements. | 6.4.2.2 6.4.3 | ○ | ○ | ○ | ○ | Software Verification Cases and Procedures | 11.13 | ① | ① | ② | ② |
| | | | | | | Software Verification Results | 11.14 | ② | ② | ② | ② |
| 3 Executable Object Code complies with low-level requirements. | 6.4.2.1 6.4.3 | ● | ● | ○ | | Software Verification Cases and Procedures | 11.13 | ① | ① | ② | |
| | | | | | | Software Verification Results | 11.14 | ② | ② | ② | |
| 4 Executable Object Code is robust with low-level requirements. | 6.4.2.2 6.4.3 | ● | ○ | ○ | | Software Verification Cases and Procedures | 11.13 | ① | ① | ② | |
| | | | | | | Software Verification Results | 11.14 | ② | ② | ② | |
| 5 Executable Object Code is compatible with target computer. | 6.4.3a | ○ | ○ | ○ | ○ | Software Verification Cases and Procedures | 11.13 | ① | ① | ② | ② |
| | | | | | | Software Verification Results | 11.14 | ② | ② | ② | ② |

LEGEND:
● The objective should be satisfied with independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 9

Verification Of Verification Process Results

| Objective | | Applicability by SW Level | | | | Output | | Control Category by SW level | | | |
|---|---|---|---|---|---|---|---|---|---|---|---|
| Description | Ref. | A | B | C | D | Description | Ref. | A | B | C | D |
| 1 Test procedures are correct. | 6.3.6b | ● | ○ | ○ | | Software Verification Cases and Procedures | 11.13 | ② | ② | ② | |
| 2 Test results are correct and discrepancies explained. | 6.3.6c | ● | ○ | ○ | | Software Verification Results | 11.14 | ② | ② | ② | |
| 3 Test coverage of high-level requirements is achieved. | 6.4.4.1 | ● | ○ | ○ | ○ | Software Verification Results | 11.14 | ② | ② | ② | ② |
| 4 Test coverage of low-level requirements is achieved. | 6.4.4.1 | ● | ○ | ○ | | Software Verification Results | 11.14 | ② | ② | ② | |
| 5 Test coverage of software structure (modified condition/decision) is achieved. | 6.4.4.2 | ● | | | | Software Verification Results | 11.14 | ② | | | |
| 6 Test coverage of software structure (decision coverage) is achieved. | 6.4.4.2a 6.4.4.2b | ● | ● | | | Software Verification Results | 11.14 | ② | ② | | |
| 7 Test coverage of software structure (statement coverage) is achieved. | 6.4.4.2a 6.4.4.2b | ● | ● | ○ | | Software Verification Results | 11.14 | ② | ② | ② | |
| 8 Test coverage of software structure (data coupling and control coupling) is achieved. | 6.4.4.2c | ● | ● | ○ | | Software Verification Results | 11.14 | ② | ② | ② | |

LEGEND:
● The objective should be satisfied with independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 10

Software Configuration Management Process

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | Configuration items are identified. | 7.2.1 | ○ | ○ | ○ | ○ | SCM Records | 11.18 | ② | ② | ② | ② |
| 2 | Baselines and traceability are established. | 7.2.2 | ○ | ○ | ○ | ○ | Software Configuration Index | 11.16 | ① | ① | ① | ① |
| | | | | | | | SCM Records | 11.18 | ② | ② | ② | ② |
| 3 | Problem reporting, change control, change review, and configuration status accounting are established. | 7.2.3 7.2.4 7.2.5 7.2.6 | ○ | ○ | ○ | ○ | Problem Reports SCM Records | 11.17 11.18 | ② ② | ② ② | ② ② | ② ② |
| 4 | Archive, retrieval, and release are established. | 7.2.7 | ○ | ○ | ○ | ○ | SCM Records | 11.18 | ② | ② | ② | ② |
| 5 | Software load control is established. | 7.2.8 | ○ | ○ | ○ | ○ | SCM Records | 11.18 | ② | ② | ② | ② |
| 6 | Software life cycle environment control is established. | 7.2.9 | ○ | ○ | ○ | ○ | Software Life Cycle Environment Configuration Index | 11.15 | ① | ① | ① | ② |
| | | | | | | | SCM Records | 11.18 | ② | ② | ② | ② |

LEGEND:
● The objective should be satisfied with independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 11

Software Quality Assurance Process

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | Assurance is obtained that software development and integral integral processes comply with approved software plans and standards. | 8.1a | ● | ● | ● | ● | Software Quality Assurance (SQA) Records | 11.19 | ② | ② | ② | ② |
| 2 | Assurance is obtained that transition criteria for the software life cycle processes are satisfied. | 8.1b | ● | ● | | | SQA Records | 11.19 | ② | ② | | |
| 3 | Software conformity review is conducted. | 8.1c 8.3 | ● | ● | ● | ● | SQA Records | 11.19 | ② | ② | ② | ② |

LEGEND:
● The objective should be satisfied with independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

TABLE 12

Certification Liaison Process

| | Objective | | Applicability by SW Level | | | | Output | | Control Category by SW level | | | |
|---|---|---|---|---|---|---|---|---|---|---|---|---|
| | Description | Ref. | A | B | C | D | Description | Ref. | A | B | C | D |
| 1 | Communication and understanding between | 9.0 | ○ | ○ | ○ | ○ | Plan for Software Aspects of Certification | 11.1 | ① | ① | ① | ① |

TABLE 12-continued

Certification Liaison Process

| Objective | | Applicability by SW Level | | | | Output | | Control Category by SW level | | | |
|---|---|---|---|---|---|---|---|---|---|---|---|
| Description | Ref. | A | B | C | D | Description | Ref. | A | B | C | D |
| the applicant and the certification authority is established. | | | | | | | | | | | |
| 2 The means of compliance is proposed and agreement with the Plan for Software Aspects of Certification is obtained. | 9.1 | ○ | ○ | ○ | ○ | Plan for Software Aspects of Certification | 11.1 | ① | ① | ① | ① |
| 3 Compliance substantiation is provided. | 9.2 | ○ | ○ | ○ | ○ | Software Accomplishment Summary | 11.20 | ① | ① | ① | ① |
| | | | | | | Software Configuration Index | 11.16 | ① | ① | ① | ① |

LEGEND:
● The objective should be satisfied with Independence.
○ The objective should be satisfied.
Blank Satisfaction of objective is at applicant's discretion.
① Data satisfies the objectives of Control Category 1 (CC1).
② Data satisfies the objectives of Control Category 2 (CC2).

DETAILED DESCRIPTION

Referring to FIG. 1, an exemplary system 10 includes software 12 that is developed to, for example, control a jet engine on an airliner 18 that is considered safety-critical system. Once the jet engine control software 12 is developed, a certification process 16 is used to assure that certification information needed to certify the software is collected. In some arrangements a "software wizard" 14 provides a user interface (UI) such that a user is guided through the certification process 14 and prompted to enter the needed certification information. After the certification information is collected, the certification process 16 processes and formats the certification information such that the user can provide the appropriate certification information to the Federal Aviation Administration (FAA) to obtain certification for the jet engine control software 12. Once the FAA certification is attained, the jet engine control software 12 can be integrated into the airliner 18 for use on the safety-critical system.

The certification process 16 is used to assure that the jet engine control software 12 is safe and airworthy. By using the certification process 16 through the software wizard 14, the user (e.g., software developer) is guided through the objectives of the "Software Considerations in Airborne Systems and Equipment Certification," guidance document (RTCA document Do-178B), incorporated by reference herein, so that certification information needed to satisfy the particular objectives associated with the jet engine control software 12 are collected. By prompting the user to provide information, the certification information needed for each appropriate objective is collected and processed into an appropriate form required for certification.

Guidance document DO-178B is typically used by civil aviation manufactures in the approval of software developed for airborne platforms. The purpose of the guidance document is to provide detailed guidelines for the production of software so that associated functions are performed at a level of confidence in safety to comply with airworthiness requirements. By complying with these requirements software products are produced by the appropriate state-of-the-practice methods.

To associate the objectives provided by the DO-178B guidance document to the safety-critical software, a system safety assessment is applied to the software development effort. A system safety assessment is a process that identifies hazards, failure conditions that lead to the hazards, and the effects of mitigating the hazards and failure conditions. Typically these assessments are performed by or in association with the FAA. As a result of the system safety assessment, the software development effort is assigned a software level. The system safety assessment task determines this software level based on a contribution of the software to the potential failure conditions and the severity of the potential failure conditions.

Referring to Table 1, five possible software levels A-E are shown in column 20 that can individually be assigned to a software development, such as the jet engine control software 12 (shown in FIG. 1). Table 1 also provides a relationship between the respective software levels and respective failure condition categories in column 22 and a summarized description of the failure condition in column 24. The range of the failure conditions and respective software levels include catastrophic conditions (software level A) that would prevent the continued safe flight or landing of the airliner 18 (shown in FIG. 1) to conditions that do not affect the operation capability of the airliner or crew (software level E).

These software levels A-E in column 20 are used to define differing degrees of rigor that the FAA applies to certify software for a safety-critical system. To apply the different degrees of rigor for each particular software level, guidance document DO-178B lists objectives that must be met to certify safety-critical software. Referring to Table 2, one exemplary objective 26 is shown that illustrates a layout and structure of each objective provided by DO-178B. The objective 26 includes an objective number 28, a description of the objective 30, and a reference 32 to the particular paragraph in DO-178B where the objective is further detailed. Following the objective 26 portion, four columns 34-40 provide the applicability of the objective to the software levels A-D (shown in Table 1). Since software level E covers non-effective software in regards to safety-critical functions, no objectives are required. Included in each respective column 34-40 is a symbol, or blank space, that corresponds to a legend 42 shown with the table. For example, this particular objective 26 is applicable for software classified under software levels A, B, and C. However, for software classified under software level D this objective does not need to be satisfied. Also, since software classified under software level E has no effect on operation of the aircraft, the objective also does not have to be satisfied. As shown for this particular objective, level A and B software requires that the objective be satisfied with independence while level C software does not require independence. As defined in the guidance document DO-178B, independence is achieved when the verification activity is performed by a person(s) other than the developer of the item being verified. For software quality assurance, independence also includes the authority to ensure corrective action.

The next two columns 44, 46 following the applicability columns 34-40, moving left to right, describe the output required to satisfy the objective. The description column 44 provides the document which reports whether the objective is satisfied or not, based on the information provided by the user, and the reference column 46 identifies the paragraph within Chapter 11 of DO-178B that details the attributes of document listed in column 44. In some objectives the description column 44 provides the particular type for code (e.g., source code, object code, executable code, etc.) that needs to be collected to satisfy the particular objective and the reference column 46 identifies the paragraph in DO-178B that details the needed code.

The last four columns 48-54 of Table 2 associate the four software levels to control category 1 (CC1) and control category 2 (CC2) listed in the legend 42. The control categories define management activities, which are defined in the guidance document DO-178B, and are addressed in producing the outputs. Typically control category 1 (CC1) requires more management activities than control category 2 (CC2). For example, CC1 requires problem reporting and change control, however, CC2 requires only change control.

Although Table 2 provides the relationship between the four software levels and the objective 26, the guidance document DO-178B includes numerous other objectives associated with safety-critical software development that are dependent upon the software level of the software development. In general the more risk of failure associated to a particular software level, the more objectives have to be satisfied. For example, the number of objectives associated to each particular software level is listed below as provided from the guidance document DO-178B:

Software Level A: 66 objectives
Software Level B: 65 objectives
Software Level C: 58 objectives
Software Level D: 28 objectives
Software Level E: 0 objectives The guidance document distributes these objectives across various development processes that are used in producing software products for safety-critical systems. These development processes are the software requirements process, the software design process, the software coding process, and the integration process. Guidance document DO-178B also describes the integral processes that ensure correctness, control, and confidence of the software life cycles and their outputs. The integral processes are the software verification process, the software configuration management process, the software quality assurance process, and the certification liaison process. Each of these processes are described in detail in the guidance document DO-178B that also includes a description of the software planning processes that define and coordinate the activities of the software development and integral processes for the software being developed for the safety-critical system.

Each of the processes are associated with one or more objectives that are listed in Annex A of DO-178B and are organized by the development processes and integral processes mentioned above. Referring to Tables 3-12, the objectives, which are similar in structure and form to the objective shown in Table 2, are listed under the respective ten processes listed below.

Table 3: Software Planning Process
Table 4: Software Development Processes
Table 5: Verification of Outputs of Software Requirements Process
Table 6: Verification of Outputs of Software Design Process
Table 7: Verification of Outputs of Software Coding & Integration Processes
Table 8: Testing of Outputs of Integration Process
Table 9: Verification of Verification Process Results
Table 10: Software Configuration Management Process
Table 11: Software Quality Assurance Process
Table 12: Certification Liaison Process By using the certification process 16 (shown in FIG. 1) through the software wizard 14 (also shown in FIG. 1) interactive environment, the user is presented each objective associated to the software being developed and prompted to provide certification information to satisfy the objective. In general, the process 16 and wizard 14 are executed by one or more computers and appropriate objectives are displayed to the user in a series of screens. The user views the series of objectives and may be prompted to enter certification information to assist the certification process 16 in collecting and processing information to satisfy the appropriate objectives that are required to certify the software for incorporation on safety-critical systems.

Referring to FIG. 2 a certification process 60 is shown that provides a user with the objectives that are associated to the particular software being developed for use on a safety-critical system such as the airliner 18 shown in FIG. 1. For example, if the user is developing software to control the jet engine on the airliner 18, the certification process 60 guides the user through all the objectives associated with developing the jet engine control software 12, which typically is assigned software level "A" by the FAA since failure of the software can prevent safe flight. In another example, a user may be developing software to control the "occupied" light on the restroom door of the airliner 18. This software maybe assigned software level "D" or "E" by the FAA since failure of the software will not reduce aircraft safety. However, similar to the jet engine control software 12, the certification process 60 can guide the user through each objective associated with the "occupied" light software assigned software level "D" or "E".

Along with guiding the user through the appropriate objectives, the certification process 60 also can produce, or assist the user in producing, outputs needed to satisfy the objectives associated to the particular software being developed. For example, the output to satisfy a particular objective may be a planning document, a design description, source code, executable code, or other type of output described in the guidance document DO-178B. Once the particular outputs have been collected that satisfy the objectives associated to the developed software, the outputs can be provided to the FAA, or other governing entity, for assessing conformance with DO-178B. Typically this conformance is determined through on-site reviews and/or desktop (data) reviews by regulatory authorities or appropriately designated industry representatives. By collecting the required outputs, each pertinent objective can be efficiently assessed to determine if the objective has been satisfied.

In some arrangements the certification process 60 uses an interactive tool, such as the software wizard 14 environment, to guide the user through the pertinent objectives associated to the safety-critical software under development. A series of dialog boxes associated with the software wizard 14 are used to enable the user to complete the certification process 60. Besides providing the appropriate objectives to the user, the wizard 14 can also provide an interactive tool to collect responses from the user to aid in satisfying the one or more displayed objectives.

The certification process 60 starts (62) when the software level assigned to the software under development for the safety-critical system is received (64). Typically the software level is determined by the FAA based on the nature of the software under development, however in some arrangements the user of the certification process 60 can enter the assigned level into the process. As mentioned above, the software levels are shown in Table 1 and range over software associated with catastrophic effects (software level A) to no effect on airliner operations (software level E). After the software level is received (64), the certification process 60 retrieves (66) the first objective that must be satisfied based on received software level. Referring briefly to Tables 3-12, each of the objectives that may be applicable to the received software level are shown. For example, objective 1 of table 3 is applicable to software levels A-D and the description of the objective, along with other appropriate associated information, would be retrieved by the certification process 60.

After the first objective has been retrieved (66), the certification process 60 displays (68) the objective to the user. In some arrangements the description of the objective is displayed to the user along with a response field for the user to input information that is used to satisfy the objective. After the objective has been the displayed (68), the certification process 60 waits to receive (70) input from the user to satisfy the objective that is currently displayed.

Figure 3A:
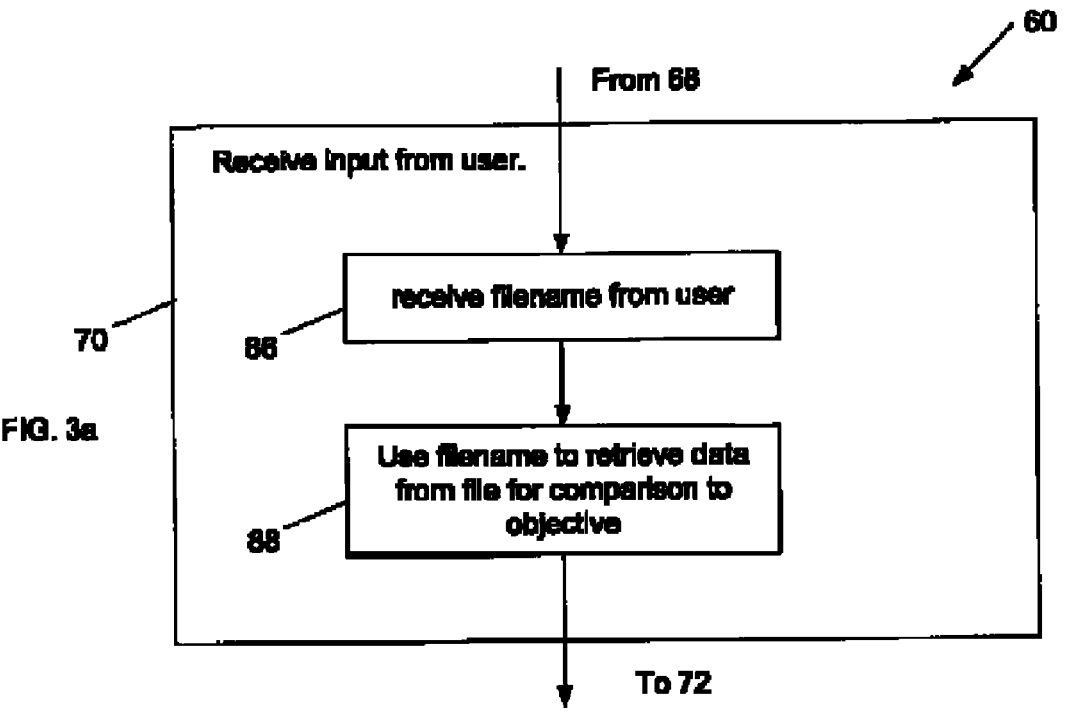

Referring to FIG. 3a, receiving (70) input from the user may, in some arrangements for certain objectives, include the certification process 60 receiving (86) a filename from the user. After the filename is received (86), the certification process 60 uses (88) the filename to retrieve data from a respective file for use as input from the user to satisfy the particular objective displayed. For example, a filename can be entered by the user to provide a system block diagram model to the certification process 60. The block diagram model, or other data structure may have been produced by the Simulink®, Stateflow®, or the Stateflow Coder® software package from Mathworks, Inc. of Natick, Mass., incorporated by reference herein. After retrieving (88) the system block diagram model or other data structure, the certification process 60 continues in FIG. 2.

Figure 3B:
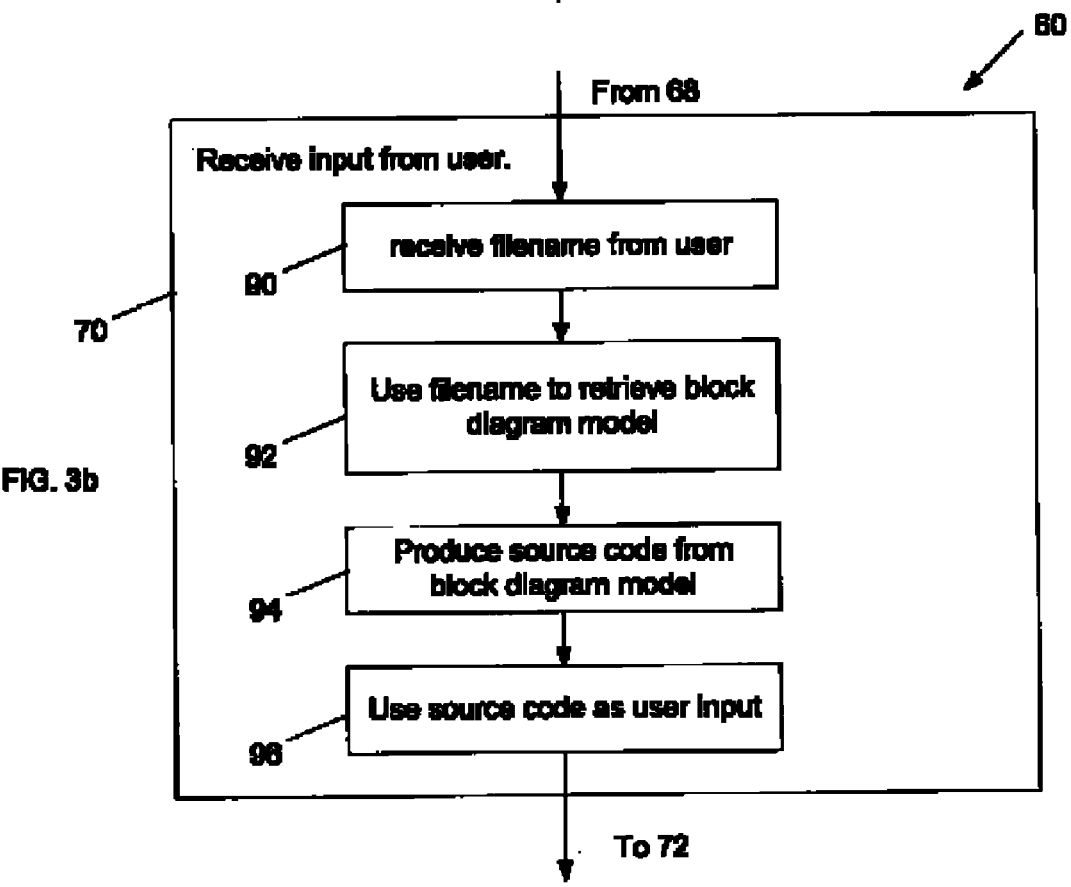

Referring to FIG. 3b, in some arrangements, receiving (70) input from the user may include receiving (90) a filename and processing data from the corresponding file to produce the information needed to satisfy the currently displayed objective. For example, after receiving (90) the filename, the certification process 60 uses the filename to retrieve (92) a block diagram model from the respective file. Once the block diagram model is retrieved (92), the certification process 60, for example, produces (94) source code by passing the block diagram model to an automatic code generation software package such as Real-Time Workshop®, Real-Time Embedded Coder Workshop®, Stateflow Coder®, etc. from Mathworks of Natick, Mass., incorporated by reference herein. Once the source code is produced (94) from the block diagram model, the certification process 60 can use (96) the source code as user input and continue the certification process 60 shown in FIG. 2 to satisfy the currently displayed objective.

Referring to FIG. 3c, in some arrangements, receiving (70) input from the user may include retrieving (98) a qualified software tool that is associated with the currently displayed objective and using the qualified software tool to produce the information needed to satisfy the currently displayed objective. By using a qualified software tool, such as a software development tool or a software verification tool as described in section 12.2 of the DO-178B guidance document, the output of the qualified software tool does not have to be verified as described by section 6 of the DO-178B guidance document. Thus, by using a qualified software tool, processes described in the DO-178B guidance document can be eliminated, reduced or automated. After retrieving (98) the qualified software tool, the certification process 60 uses (100) the qualified software tool to produce verified source code. After the verified source code is produced (100), the certification process 60 can use (102) the source code as user input and continue the certification process 60 shown in FIG. 2 to satisfy the currently displayed objective.

Returning again to FIG. 2, after receiving (70) input from the user, the certification process 60 collects and processes (72) the input to satisfy the currently displayed objective. For example, the format or structure of the user input can be altered to satisfy the displayed objective. Also, the processed user input can be stored for assessing at a later time. Once the input is collected and processed (72) the certification process 60 produces (74) the one or more outputs, as described in the DO-178B guidance document, which are needed to satisfy the current objective. This output, as detailed in DO-178B, may be a document, a file containing a document, a file containing a block diagram model, a file containing source code, or a file containing some other similar information needed to satisfy an objective of the DO-178B guidance document. In some arrangements the output may include a Boolean variable that reports whether the objective has been met or not.

After producing (74) the output, the certification process 60 stores (76) the output for later accessing by the user, or another party, to determine if the objectives have be met or not. After storing (76) the output, the certification process 60 determines (78) if all the appropriate objectives have been displayed to the user based on the particular software level assigned to the developed software. Referring briefly to Tables 3-12, the applicability for each of software level is provided and as mentioned may currently include up to 66 individual objectives.

Returning to FIG. 2, if the certification process 60 determines (78) that at least one more objective is to be assessed, the certification process 60 retrieves (80) the next pertinent objective and returns to display (68) the next objective and repeat the process for this objective. If determined (78) that no more objectives are applicable to the software being assessed, based on the received software level, the certification process 60 produces (82) an output report for the user that reports whether each pertinent objective is satisfied and the particular certification information that satisfied each objective. Once the output report has been produced (82), the certification process 60 exits (84).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In conjunction with FIG. 1-3 the guidance document DO-178B is used to determine if the developed software meets the appropriate objectives and can be incorporated into the safety-critical system (i.e., the airliner 18). However, in some arrangements other guidance documents can be used by the certification process 60 (shown in FIG. 2) to certify software for other safety-critical systems. For example, the United States of America Department of Defense Military Standard for Software Development and Documentation (MIL-STD-498) can be used by the certification process 60 for certifying software for weapons systems and automated information systems. In some arrangements the certification process 60 can use the International Electrotechnical Commission (IEC) standard 61508 that covers safety-related systems that are electrotechnical in nature (e.g., electromechanical systems, solid-state electronic systems and computer-based systems). For example, the IEC 61508 standard can be used to certify safety-critical industrial control systems. In still another example, the certification process 60 can use the United Kingdom (UK) Ministry of Defense guidance documents MoD-00-55, MoD-00-56, and MoD-00-58 for certifying safety-critical military systems in the UK. In still another example, the certification process 60 can use the Food and Drug Administration guidance document FDA-247 to certify software for safety-critical medical equipment. Also, the certification process 60 can use the U.S. Nuclear Regulatory Commission guidance document 1.173 for certifying software associated with safety-critical nuclear power systems.

Also in conjunction with FIG. 1-3, user input is provided by information entered into a field or a user-entered filename. User input is also provided by processing a block diagram model into source code. However, the user input may also be provided by MATLAB®, Simulink®, Stateflow®, Real-Time Workshop®, Real-Time Workshop Embedded Coder®, Stateflow Coder®, Simulink Performance Tools®, model based test tools, Simulink Report Generator®, or source control interfaces (e.g., the Requirements Management Interface®, the Requirements Management Interface®, etc.) from the Mathworks, Inc. of Natick, Mass., incorporated by reference herein.

Also, in conjunction with FIG. 1-3 a qualified software tool is used to produce verified source code to satisfy an objective. However, in some arrangements a qualified software tool can be used by the certification process 60 to satisfy more than one objective, or to satisfy one or more processes described in the DO-178B guidance document, or to satisfy one or more of the tables described in the DO-178B guidance document. Additionally, the certification process 60 can be qualified to be a qualified software tool such that verified output, as described in the DO-178B guidance document, is provided by the certification process 60.

Also, in conjunction with FIG. 1-3 certification process 60 output is a report to the user that detailed whether each pertinent DO-178B objective was satisfied or not. However in some arrangements the certification process output includes documents, software code (e.g., source code, object code, executable code, etc.) that can be compiled or interpretive, block diagram model outputs, or other information in a structure or form that is assessable by the MATLAB®, Simulink®, Stateflow®, Real-Time Workshop®, Real-Time Workshop Embedded Coder®, Stateflow Coder®, Simulink Performance Tools®, model based test tools, Simulink Report Generator®, or a source control interface (e.g., Requirements Management Interface®, Configurations Management Interface®, etc.) individually or in combination.

Other embodiments are within the scope of the following claims.

What is claimed is:

1. A computer implemented method for collecting certification information associated with software for a safety-critical system, the method comprising:

receiving a software level assigned to the software for the safety-critical system;

retrieving a first criterion for certifying the software for the safety-critical system, the first criterion including a plurality of objectives based on the software level;

providing a user interface for sequentially displaying the plurality of objectives;

sequentially displaying the plurality of objectives of the first retrieved criterion to the user, the plurality of objectives requiring a user to provide certification information to satisfy the plurality of objectives of the first retrieved criterion;

receiving user input certification information associated with the plurality of objectives displayed to the user via the user interface, the user input certification information providing a block diagram model of a dynamic system generated in a graphical modeling environment;

producing source code from the block diagram model and using the source code as the user input certification information;

determining if the user input certification information aids in satisfying the plurality of objectives for certifying the software for the safety-critical system;

displaying output information, the output information identifying if the first criterion is satisfied, the user input certification information and the output information being produced from the block diagram model generated in the graphical modeling environment; and determining that all objectives of the first criterion are displayed to the user.

2. The method of claim 1 in which the user input certification information is received in response to a request.

3. The method of claim 1 in which the user input certification information includes user-entered text.

4. The method of claim 1 in which the user input certification information includes a user-entered file identifier.

5. The method of claim 4 in which the file identifier identifies a file containing a block diagram model.

6. The method of claim 4 in which the file identifier identifies a file containing information satisfying the first criterion.

7. The method of claim 1 further comprising storing the received user input certification information.

8. The method of claim 1 further comprising storing the output information.

9. The method of claim 1 further comprising processing the user input certification information into processed information satisfying the first criterion.

10. The method of claim 9 further comprising storing the processed information.

11. The method of claim 1 in which the first criterion includes an objective of a guidance document.

12. The method of claim 11 in which the guidance document is the Radio Technical Committee on Aeronautics guidance document DO-178B.

13. The method of claim 1 in which displaying the output information includes producing an output document.

14. The method of claim 1 in which the safety-critical system includes an aircraft.

15. The method of claim 1 in which the software level is based on the software failing on the safety-critical system.

16. The method of claim 1 in which the receiving user input includes using a qualified software tool.

17. The method of claim 1 in which the method of collecting certification information associated with a software for a safety-critical system includes using a qualified software tool.

18. The method of claim 1 further comprising repeating retrieving, providing, sequentially displaying, receiving, determining, displaying and determining for a second criterion, different from the first criterion.

19. An article comprising:
a storage medium having stored thereon instructions that when executed by a machine perform the following:
receive a software level assigned to software for a safety-critical system;

retrieve a first criterion for certifying the software for the safety-critical system, the first criterion including a plurality of objectives based on the software level;

present a user interface for sequentially displaying the plurality of objectives;

sequentially display the plurality of objectives of the first retrieved criterion to the user, the plurality of objectives requiring a user to provide certification information to satisfy the plurality of objectives of the first retrieved criterion;

receive user input certification information associated with the plurality of objectives displayed to the user via the user interface, the user input certification information providing a block diagram model of a dynamic system generated in a graphical modeling environment;

producing source code from the block diagram model and using the source code as the user input certification information;

determine if the user input certification information aids in satisfying the plurality of objectives for certifying the software for the safety-critical system;

display output information, the output information identifying if the first criterion is satisfied, the user input certification information and the output information being produced from the block diagram model generated in the graphical modeling environment; and determine that all objectives of the first criterion are displayed to the user.

20. The article of claim 19 further in which the user input certification information is received in response to a request.

21. The article of claim 19 in which the user input certification information includes user-entered text.

22. The article of claim 19 in which the user input certification information includes a user-entered file identifier.

23. The article of claim 22 in which the file identifier identifies a file containing a block diagram model.

24. The article of claim 22 in which the file identifier identifies a file containing information satisfying the first criterion.

25. The article of claim 19 further comprising instructions that when executed cause the machine to store the received user input certification information.

26. The article of claim 19 further comprising instructions that when executed cause the machine to store the output information.

27. The article of claim 19 further comprising instructions that when executed cause the machine to process the user input certification information into processed information satisfying the first criterion.

28. The article of claim 27 further comprising instructions that when executed cause the machine to store the processed information.

29. The article of claim 19 in which the first criterion includes an objective of a guidance document.

30. The article of claim 29 in which the guidance document is the Radio Technical Committee on Aeronautics guidance document DO-178B.

31. The article of claim 19 in which the instructions to display the output information include instructions to produce an output document.

32. The article of claim 19 in which the safety-critical system includes an aircraft.

33. The article of claim 19 in which the software level is based on the software failing on the safety-critical system.

34. The article of claim 19 in which the instructions to receive user input includes instructions to use a qualified software tool.

35. The article of claim 19 in which the instructions stored on the storage medium includes qualified software tool instructions.

36. The article of claim 19 further comprising instructions that when executed cause the machine to repeat retrieving, presenting, sequentially displaying, receiving, determining, displaying and determining for a second criterion, different from the first criterion.

37. A computing system comprising:
a processor for executing a graphical user interface (GUI), the GUI comprising:
a workspace;
a set of graphical semantics for displaying a software level assigned to software for a safety-critical system;
a set of graphical semantics for displaying a first criterion for certifying software for the safety-critical system, the first criterion including a plurality of objectives based on the software level;
a set of graphical semantics for sequentially displaying the plurality of objectives of the first retrieved criterion to a user, the plurality of objectives requiring the user to provide certification information to satisfy the plurality of objectives of the first retrieved criterion;
a set of graphical semantics for receiving user input certification information to aid in satisfying the plurality of objectives, the user input certification information providing a block diagram model of a dynamic system generated in a graphical modeling environment;
a set of semantics for producing source code from the block diagram model and using the source code as the user input certification information; and
a set of graphical semantics for displaying output information, the output information identifying if the first criterion is satisfied following a determination as to whether the user input certification information aids in satisfying the plurality of objectives for certifying the software for use on the safety-critical system, the user input certification information and the output information being produced from the block diagram model generated in the graphical modeling environment.

38. The computing system of claim 37 in which the user input certification information is received in response to a request.

39. The computing system of claim 37 in which the graphical user interface includes a qualified software tool.

40. The computing system of claim 37 further comprising a set of graphical semantics for displaying a second criterion for certifying the software for the safety -critical system.

* * * * *

UNITED STATES PATENT AND TRADEMARK OFFICE
CERTIFICATE OF CORRECTION

PATENT NO. : 7,913,232 B2
APPLICATION NO. : 10/371975
DATED : March 22, 2011
INVENTOR(S) : Thomas J. Erkkinen Page 1 of 1

It is certified that error appears in the above-identified patent and that said Letters Patent is hereby corrected as shown below:

On the Title Page, at Item (73) Assignee, replace "The Math Works, Inc." with
--The MathWorks, Inc.--.

Signed and Sealed this
Second Day of December, 2014

Michelle K. Lee
*Deputy Director of the United States Patent and Trademark Office*